(12) United States Patent
Demartin Maeder et al.

(10) Patent No.: US 8,362,130 B2
(45) Date of Patent: *Jan. 29, 2013

(54) IR-ABSORBING INTAGLIO INK

(75) Inventors: Marlyse Demartin Maeder, La Sarraz (CH); Claude-Alain Despland, Prilly (CH); Edgar Mueller, Fribourg (CH); Pierre Degott, Crissier (CH)

(73) Assignee: SICPA Holding SA, Prilly (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/300,097

(22) Filed: Nov. 18, 2011

(65) Prior Publication Data

US 2012/0065313 A1   Mar. 15, 2012

Related U.S. Application Data

(63) Continuation of application No. 12/093,982, filed as application No. PCT/EP2006/068586 on Nov. 16, 2006, now Pat. No. 8,080,307.

(30) Foreign Application Priority Data

Nov. 25, 2005   (EP) .................................. 05111295

(51) Int. Cl.
  *C08K 3/32* (2006.01)
  *C08K 3/40* (2006.01)
(52) U.S. Cl. ........................ 524/417; 524/443
(58) Field of Classification Search .................. 524/417, 524/443
  See application file for complete search history.

(56) References Cited

U.S. PATENT DOCUMENTS

| | | | |
|---|---|---|---|
| 2,265,437 A | 12/1941 | Luthy et al. | |
| 3,550,033 A | 12/1970 | Chimann et al. | |
| 3,705,043 A | 12/1972 | Zabiak | |
| 3,748,165 A | 7/1973 | Hill | |
| 3,870,528 A | 3/1975 | Edds et al. | |
| 4,244,741 A | 1/1981 | Kruse | |
| 4,296,214 A | 10/1981 | Kamada et al. | |
| 4,966,628 A | 10/1990 | Amon et al. | |
| 5,173,212 A | 12/1992 | Speit et al. | |
| 5,236,633 A | 8/1993 | Satake et al. | |
| 5,354,514 A | 10/1994 | Satake et al. | |
| 5,367,005 A | 11/1994 | Nachfolger | |
| 5,466,755 A | 11/1995 | Sakagami et al. | |
| 5,512,095 A | 4/1996 | Sens et al. | |
| 5,658,964 A | 8/1997 | Amon et al. | |
| 5,723,075 A | 3/1998 | Hayasaka et al. | |
| 5,800,861 A | 9/1998 | Chiang et al. | |
| 5,911,921 A | 6/1999 | Takai et al. | |
| 6,379,779 B1 | 4/2002 | Murt | |
| 6,410,613 B1 | 6/2002 | Ohnishi et al. | |

(Continued)

FOREIGN PATENT DOCUMENTS

| CN | 1690135 | 11/2005 |
|---|---|---|
| EP | 0263446 | 4/1988 |

(Continued)

OTHER PUBLICATIONS

Interlocutory decision in opposition proceedings, dated Jun. 9, 2011, in counterpart European Application No. 1790701 B1.

(Continued)

*Primary Examiner* — Vu A Nguyen
(74) *Attorney, Agent, or Firm* — Greenblum & Bernstein, P.L.C.

(57) ABSTRACT

Pasty ink for the engraved steel die printing process, having a viscosity value above 3 Pa·s, preferably above 5 Pa·s at 40° C., and comprising an infrared absorbing material, wherein said infrared absorbing material is a transition element compound whose IR-absorption is a consequence of electronic transitions within the d-shell of transition element atoms or ions.

26 Claims, 5 Drawing Sheets

U.S. PATENT DOCUMENTS

| | | |
|---|---|---|
| 6,710,197 B1 | 3/2004 | Jong et al. |
| 6,787,583 B2 | 9/2004 | Veya et al. |
| 6,926,764 B2 | 8/2005 | Bleikolm et al. |
| 2004/0082460 A1 | 4/2004 | Yamane et al. |
| 2004/0245343 A1 | 12/2004 | Depta |
| 2004/0253419 A1 | 12/2004 | Bleikolm et al. |
| 2006/0017957 A1 | 1/2006 | Degott et al. |

FOREIGN PATENT DOCUMENTS

| | | |
|---|---|---|
| EP | 0340163 | 11/1989 |
| EP | 0432093 | 6/1991 |
| EP | 0552047 | 7/1993 |
| EP | 0608118 | 7/1994 |
| EP | 0663429 | 7/1995 |
| EP | 0750026 | 12/1996 |
| EP | 1308485 | 5/2003 |
| EP | 1403333 | 3/2004 |
| JP | 05-093160 | 4/1993 |
| JP | 05-279078 | 10/1993 |
| JP | 06-107985 | 4/1994 |
| JP | 06-207161 | 7/1994 |
| JP | 6-286363 | 10/1994 |
| JP | 08-143853 | 6/1996 |
| JP | 08-209110 | 8/1996 |
| JP | 09-030104 | 2/1997 |
| JP | 09-031382 | 2/1997 |
| JP | 09-077507 | 3/1997 |
| JP | 09-104857 | 4/1997 |
| JP | 10-060409 | 3/1998 |
| WO | 98/28374 | 7/1998 |
| WO | 98/58805 | 12/1998 |
| WO | 02/094952 | 11/2002 |
| WO | 03/038001 | 5/2003 |
| WO | 2004/016442 | 2/2004 |
| WO | 2004/029163 | 4/2004 |

OTHER PUBLICATIONS

Gouterman, "Spectra of Porphyrins", Journal of Molecular Spectroscopy 6, 1961, Harvard University, Cambridge, Massachusetts, U.S., pp. 138-163.

Lever, "Inorganic Electronic Spectroscopy", Second Edition, "Studies in Physical and Theoretical Chemistry, vol. 33", 1984, Chapter 6, Elservier, Amsterdam, pp. 376-611.

Lever, "Inorganic Electronic Spectroscopy", Second Edition, "Studies in Physical and Theoretical Chemistry, vol. 33", 1984, Chapter 9, Elservier, Amsterdam, pp. 736-790.

"Optimising the interaction of ink, plates, and other consumables", KBA Process 2, 2005, p. 7 (original German version and English equivalent).

"Cobalt Octoate", product information, p. 1 and 2, http://chemicalland21.com/industrialchem/organic/COBALT%20OCTOATE.htm.

Partial English translation of Japanese Office action in conection with counterpart Japanese Patent Application No. 2008-541711.

IR-ABSORBING INTAGLIO INK

CROSS-REFERENCE TO RELATED APPLICATIONS

This application is a continuation of application Ser. No. 12/093,982 which is a national stage of PCT/EP2006/068586, filed Nov. 16, 2006, which claims priority to European Application No. 05111295.1, filed Nov. 25, 2005. The disclosures of application Ser. No. 12/093,982 and PCT/EP2006/068586 are incorporated by reference herein in their entireties.

The present invention is in the field of inks and coating compositions. In particular, it is about an ink for the engraved steel die (Copperplate-, Intaglio-) printing process, which is used for printing currency and other security documents. More particularly, the Intaglio ink of the present invention is designed to selectively absorb radiation in parts of the 'optical infrared' spectrum, whilst being transparent in other parts of it.

Compounds and coatings which absorb radiation in the 'optical infrared' range of the electromagnetic spectrum, i.e. between 700 nm and 2'500 nm wavelength, are known to the skilled man. Such materials are used as solar energy absorbers, as well as for producing hidden, machine-readable indicia on objects or documents, for the automated processing or authentication of the said objects or documents by machines.

Throughout this description, the expressions 'infrared' or 'IR' are used to designate the spectral range between 700 nm and 2'500 nm wavelength. The term 'visible' shall designate the spectral range between 400 nm and 700 nm wavelength. The term 'ultraviolet' or 'UV' shall be applied to wavelengths which are shorter than 400 nm. Furthermore, the expressions 'near-infrared' or 'NIR' are used to designate the spectral range between 700 nm and 1'100 nm wavelength, which corresponds to radiation which is detectable by the usual silicon photodetectors.

Throughout this description, the terms engraved steel die printing process, Copperplate printing process, and Intaglio printing process are used synonymously for the same printing technique.

A first group of early patents on infrared-related printing technology was exclusively related to processing aspects: U.S. Pat. No. 3,705,043 (Zabiak) discloses an infrared-absorbing (IR-absorbing) ink-jet printing ink composition, for the printing of machine-readable barcodes. At the time of this disclosure (1972), barcode reading equipment was, for technical reasons, tied to the 'near infrared' (700 nm-1100 nm) range of the spectrum; for this reason an infrared-absorbing nigrosine organic dye was added to the ink, in order to render it 'machine-visible', too. A similar technical purpose was pursued in U.S. Pat. No. 3,870,528 (Edds et al., IBM), and in U.S. Pat. No. 4,244,741 (Kruse, US Postal Service); this latter patent teaches the use of a reduced heteropoly-(phosphomolybdic-) acid as an inorganic infrared absorber. It can be summarized that these publications did not refer to the use of IR-absorbing substances as security markings.

A second group of publications is related to security documents: EP-A-0 552 047 (Nishida et al., Hitachi Maxell Ltd.) discloses a security document carrying a printed infrared-absorbing mark, comprising a colored concealing layer to hide the IR-absorbing security element in the visible spectral range of 400 nm-700 nm. The IR-absorbers according to the teaching of the EP-A-0 552 047 document must be used in conjunction with concealing layers which camouflage their existence and location to the unaided eye. EP-A-0 263 446 (Abe et al., Dainichiseika Color & Chemicals Mfg. Co. Ltd.) discloses an anti-copy print comprising covert information on a security document, as well as a method for producing the said print, wherein an IR-absorbing black ink is used additionally and in conjunction with the IR-transparent standard four-color process inks. The 'IR-absorbing black' is preferably carbon black, which absorbs without discrimination over the whole visible and infrared spectral range, whereas the 'IR-transparent black' is an organic dye which absorbs only in the visible range of the spectrum.

In the field of automated banknote processing, IR-absorption plays an important role. Most of the actually circulating currency carries not only visibly colored printings, but also specific features which are only detectable in the infrared part of the spectrum. Generally, these IR-features are implemented for use by automatic currency processing equipment, in banking and vending applications (automatic teller machines, automatic vending machines, etc.), in order to recognize a determined currency bill and to verify its authenticity, in particular to discriminate it from replicas made by color copiers. WO-A-04/016442 (Banque de France) is about documents protected by an infrared-absorbing material.

The visible appearance (black) of the infrared absorbing inks according to EP-A-0 263 446 is perceived as a disadvantage in security application, where IR-absorption should be used as an additional, covert, i.e. invisible feature. A way around this difficulty can be found by camouflaging the IR-absorbing ink through overprinting, or by playing with pairs of IR-absorbing and IR-transparent inks having a same visible color; however the latter option imposes a rather constricting limitation to the document designer, as it is not compatible with clear shades.

A further group of patents discloses invisible IR-absorbers, which can be used in inks of all shades (including white), without contributing to their visible appearance: EP-A-0 608 118 (Yoshinaga et al., Canon K. K.) discloses a medium (such as a banknote, security document, etc.), recorded with invisible information, as a machine-readable recognition means for security documents, in order to prevent their copying on copy machines. The recording is realized using near-infrared-absorbing, cyanine-type organic materials, which are colorless and trans-parent in the visible part of the spectrum, and thus invisible to the human eye. A similar approach was taken by Tashima et al., Dainippon Printing Co. Ltd., who disclosed the use of inorganic ytterbium phosphate ($YbPO_4$) as an invisible, IR-absorbing security element, as well as corresponding inks and coating compositions containing it, together with security documents and security patterns which can be realized with it (JP 08-143853 A2; JP 08-209110 A2; JP 09-030104 A2; JP 09-031382 A2; JP 09-077507 A2; JP 09-104857 A2; JP 10-060409 A2). Finally, U.S. Pat. No. 5,911,921 (Takai et al.; Shin-Etsu Chemical Co., Ltd.) discloses a non-stoichiometric ytterbium phosphate of even lower infrared reflectivity, to be used as an IR-absorbing security material.

The organic and inorganic IR-absorbers of this latter group of documents overcome thus the disadvantages of the visible coloration of the IR-absorber; however, there is another shortcoming linked to their use, noteworthy the rather narrow spectral width of the infrared absorption bands displayed by the organic cyanine-type dyes and the $YbPO_4$ IR-absorber. The detection (reading) of narrow-band IR-absorption features noteworthy requires particularly adapted detecting equipment to read the precise absorption wavelength in question, and, in the case of $YbPO_4$, the use of a relatively high concentration of the IR-absorbing material in the printing ink.

A large number of different models of currency processing equipment from many suppliers throughout the world is currently on the market. This equipment, albeit enabled to check banknotes for IR-absorption, is by no means working at one and the same IR wavelength; an 'IR-color standard', analogous to the CIELAB standard used in visible colorimetry, does actually not exist. Narrow-band IR-absorbers are, therefore, not compatible with generic currency processing applications, for compatibility reasons with the already existing processing equipment. Noteworthy, an adaptation of the existing currency processing equipment in banking and automatic vending applications upon each change to a new type of IR-absorbing security element is not normally feasible.

On the other hand, the classical option of using carbon black as an indiscriminate, broad-band IR-absorber, has the already mentioned shortcoming of constraining the banknote designer to merely dark or black shades. To this adds the general availability of such type of materials; thus, carbon black, albeit being an IR-absorber, can not be considered a security material. The same holds for the semi-metallic graphite material, whose use as an IR-absorbing pigment on security documents was disclosed by Mürl in WO-A-98/28374.

Ideally, the IR-absorber for currency processing applications should be transparent in the visible range (400 nm to 700 nm), such as to allow its use in all types of visibly colored inks and also in markings which are invisible to the naked eye, and display a strong absorption in the near-infrared range (700 nm to 1'100 nm), such as to allow its easy recognition by standard currency processing equipment (based on silicon IR-photodetectors, which are sensitive up to 1'100 nm). The IR-absorber should furthermore be transparent again somewhere in the range of 1'100 nm to 2'500 nm, in order to allow a discrimination of the specific currency security feature from a simple carbon black or graphite printing, which absorbs indiscriminately over the whole IR-range. Such discrimination may be effectuated e.g. by a simple transparency check in the 1'100-2'500 nm region, using an appropriate (Ge, InGaAs, etc.) photocell.

Steel die (Copperplate-, Intaglio-) printing is a rather specific method for the production of currency and other high-security, State-issued documents. Intaglio printing machines are heavyweight and expensive equipment, which is not otherwise available for commercial printing applications, and which is exclusively used at the world's few high-security printing facilities. As a consequence, even a security feature of modest physical sophistication can be taken to the high-security level if it is applied through an intaglio printing process. For related prior art about inks for the steel die printing process see EP-A-0 340 163; EP-A-0 432 093; U.S. Pat. No. 4,966,628; U.S. Pat. No. 5,658,964; as well as WO 02/094952 of the applicant; the contents of these documents being included herein by reference.

Intaglio inks for security printing are characterized by their pasty consistency (having a rather high viscosity value, of more than 3, preferably more than 5 Pascal*sec (Pa·s) at 40° C.) and, in particular, by their high solid contents, of typically more than 50% by weight. Security documents such as banknotes must furthermore be durable and resist to sunlight and environment-influences (i.e. moisture, oxygen, laundry and the commonly available solvents and chemicals). Particularly well-resistant ink formulations, comprising high-performance epoxy-ester or urethane binder resins, are therefore used to print such documents. The pigments, fillers, and other solids comprised in an intaglio ink are, for the same reason, preferably chosen to be inorganic compounds; organic pigments of proven high resistance can be used as well, however.

It is an object of the present invention to provide an Intaglio printing ink fulfilling the above requirements.

It has now been surprisingly found that the above object is solved by an ink for the engraved steel die printing process, said ink comprising a polymeric organic binder, an infrared absorbing material, and, if required, solvent and/or fillersaid ink having a pasty consistency with a viscosity value of at least 3, preferably 5 Pa·s at 40° C., and wherein said infrared absorbing material comprises transition element atoms or ions whose infrared absorption is a consequence of electronic transitions within the d-shell of the transition element atoms or ions.

There was surprisingly discovered a class of materials which are suitable as broad-band IR-absorbers in Intaglio printing inks, fitting the said requirements and overcoming the drawbacks of both, the narrow-band IR-absorbers, and of the indiscriminate carbon black or graphite IR absorbers. Said infrared-absorbing materials, which can be of organic or of inorganic nature, are characterized in that they contain specific chemical elements having an incomplete electronic d-shell (i.e. atoms or ions of transition elements), and whose infrared absorption is a consequence of electronic transitions within the said d-shell of the atom or ion. Selected compounds of suitable transition element atoms or ions were found to absorb in the NIR (700 nm to 1'100 nm) range, whilst being almost transparent in the visible range (400 nm to 700 nm) of the spectrum, as well as in some range between 1'100 nm and 2'500 nm. These materials, despite the fact that they only show a moderately strong absorption in the said NIR range, can be applied through Intaglio printing, such that a sufficient amount of IR-absorbing material is transferred onto the security document to result in a useful IR-contrast (absorption density).

Electronic d-d transitions, taking place within the incomplete d-shell of a transition element atom or ion, are known to the man skilled in inorganic spectroscopy. Reference is made in this context to A. B. P. Lever, "Inorganic Electronic Spectroscopy", $2^{nd}$ edition, "Studies in Physical and Theoretical Chemistry, Vol. 33", Elsevier, Amsterdam, 1984, Chapter 6. The terms 'transition element' or 'transition metal' shall apply in the context of the present invention to the chemical element sequences no 22 (Ti) to 29 (Cu), no 40 (Zr) to 47 (Ag), and no 72 (Hf) to 79 (Au) of the Periodic System, with particular emphasis on the first transition series (Ti, V, Cr, Mn, Fe, Co, Ni, Cu).

Preferably, the transition element in the infrared absorbing compound is present in the form of an ion such as a titanium (III), a vanadium(IV)=vanadyl, a chromium(V), an iron(II), a nickel(II), a cobalt(II) or a copper(II) ion (corresponding to the chemical formulas $Ti^{3+}$, $VO^{2+}$, $Cr^{5+}$, $Fe^{2+}$, $Ni^{2+}$, $Co^{2+}$, and $Cu^{2+}$). More than one transition element atom or ion, as well as other atoms or ions (cations or anions), may furthermore be present in the said compound, either for structural reasons, or to exploit a cumulative effect.

Materials whose light absorption is a consequence of electronic transitions within the d-shell of transition element atoms or ions exhibit a merely moderate specific absorption. Their lack of specific light absorption must therefore be compensated by a correspondingly high amount of material, i.e. a sufficiently thick layer of the material must be present to produce the required absorption property. The d-shell-transition based IR-absorbing materials of the prior art were for this reason either applied in a thick coating layer (IR-absorbing paints for solar panels), or used as a filler in the mass of a plastic material.

D-shell transition element based infrared absorbers have, however, not been used in common printing applications, where the available layer thickness ranges from merely a few micrometers in offset and flexographic printing, to at most 10 to 15 micrometers of dry residue in screen printing applications, and wherein only a fraction of the total layer thickness represents the pigment loading. Under such constraint, the skilled in the art of ink formulation prefers to use an IR-absorbing material which exhibits a high specific absorption in the infrared, in order to achieve the sought result with a reduced amount of material.

It has been found that using the Intaglio printing process, it is possible to transfer a rather thick layer (up to 50 micrometers) of a high solid content ink onto a substrate. Thus, by using the Intaglio printing process, it is possible to apply a sufficient amount of the said d-shell transition based IR-absorbing materials onto a document, so as to result in a useful infrared contrast. Moreover, the disclosed IR-absorbing materials are not commonly available for printing applications, which makes them suited for use in security printing, because of the absence of easily available counterfeit opportunities.

The infrared-absorbing properties of transition element compounds are known and already exploited in certain areas of technology. Iron(II) and copper(II) compounds, having a $Fe^{2+}$ or a $Cu^{2+}$ ion in an appropriate chemical environment, have proven to be efficient broad-band IR absorbing materials in the near-infrared range. Appropriate iron(II) or copper(II) compounds are transparent in the visible range of the spectrum—exhibiting at most a slightly yellowish or bluish shade—and stable under ambient environment conditions (i.e. oxygen and moisture exposure). An 'appropriate chemical environment' is e.g. a phosphate or polyphosphate ion, or, more generally, phosphorus and oxygen containing group; in many of the disclosed IR-absorbing materials of the prior art, a Cu $(^{2+})$ or a Fe $(^{2+})$ ion is in fact linked by an oxygen atom to a phosphorus atom, forming a M-O—P atom sequence.

U.S. Pat. No. 4,296,214 (Kamada et al., Mitsubishi Rayon Co., Ltd.) disclose solar-absorbing acrylic resin having copper(II) containing acrylic diphosphonate esters copolymerized therein. U.S. Pat. No. 5,466,755 (Sakagami et al., Kureha Kagaku Kogyo K. K.) discloses a plastic optical filter material, based on a monohydrogenophosphate-diester-and dihydrogenophosphate-monoester groups containing acrylic copolymer, into which copper(II) and/or iron(II) ions are incorporated. U.S. Pat. No. 6,410,613 (Ohnishi et al., Kureha Kagaku Kogyo K. K.) is about further IR-absorbing phosphate ester polymers comprising copper ions. These polymer materials are useful as near-infrared absorbers (filters) in the wavelength range of 700 nm to 1200 nm, but they have, up to present, not been used in printing inks.

U.S. Pat. No. 5,236,633 and U.S. Pat. No. 5,354,514 (Satake et al., Jujo Paper Co., Ltd.) describe near-infrared absorbing materials based on a transparent thermoplastic polymer (polymethacrylate, polycarbonate, polyethylene, vinyl chloride, etc.), an organic thiourea compound, and a copper compound, which are melted together to give a visible-transparent (slightly bluish), IR-absorbing plastic material. U.S. Pat. No. 5,723,075 (Hayasaka, Nippon Paper Industries, Co., Ltd.) discloses similar technology, except that dimerised organic thiourea derivatives are used.

Patents U.S. Pat. No. 2,265,437 and U.S. Pat. No. 5,800,861, granted to The Sherwin-Williams Company, disclose the use of, among others, copper phosphate, basic copper phosphate, and copper pyrophosphate in IR-absorbing coatings for the production of passive solar collectors and the like. These coatings are characterized in that they have, in addition to their visible absorption, a broad absorption band in the 700 nm to 1200 nm region.

Phosphate and/or fluoride containing glasses comprising copper(2+) ions have also been used as IR-absorbers, in particular for IR-cut-off filters in the optical industry. U.S. Pat. No. 5,173,212 (Speit et al., Schott Glaswerke) and US 2004/0082460 (Yamane et al., HOYA Corporation) disclose corresponding glass formulas and the resulting light absorption spectra.

JP 05-279078 A2 (Manabe et al., Asahi Glass Co. Ltd.) discloses a near-infrared absorbing material for application by screen-printing, which is a colorless copper(II) phosphoric acid glass powder, admixed to a resin material, used for the machine-reading of information by laser light in the near infrared. JP 06-207161 A2 (Usui et al., Asahi Glass Co. Ltd.) discloses another screen-printing ink which contains copper (II) phosphates, as an absorber for semiconductor laser light (810 nm). JP 05-093160 A2 (Matsudaira, Toppan Printing Co. Ltd.) discloses a two-component screen printing ink for the printing of invisible, classified information. The ink comprises, as an IR-absorber, a powdered phosphate glass containing iron(II) and/or copper(II) oxide (of Asahi Glass Co. Ltd.). JP 06-107985 A2 (Matsudaira et al., Toppan Printing Co. Ltd.) discloses a further two-component IR-absorbing ink, based on glassy, white copper(II) and/or copper/iron(II) phosphates as the IR-absorber. These inks are used for the printing of machine-readable barcodes on security documents, such as long-lasting plastic credit cards, ID cards, etc., where the printed information must be read by a semiconductor near-infrared laser.

Engraved steel die (copperplate-, intaglio-) printing inks, comprising the said classes of copper(II) or other transition element atom or ion containing, broad-band near-infrared-absorbing compounds have, however, not been disclosed up to now.

The ink of the present invention, for the engraved steel die printing process, comprises an organic binder resin, preferably of the high-resistance epoxy-ester, urethane-alkyd or of the UV-curing type, as well as an infrared absorbing material according to the invention, optionally one or more pigments to produce the desired visible color, optionally fillers and/or solvent to adjust the ink's viscosity to a value above 3 Pa·s, preferably above 5 Pa·s at 40° C., and optionally further additives, such as siccativating agents (driers), photoinitiators, waxes, and rheological additives. The said infrared absorbing material is a transition element compound whose IR-absorption is due to electronic transitions within the d-shell of transition element atoms or ions. The formulation of intaglio inks and the materials commonly employed to make intaglio inks (i.e. the binders, fillers, solvents, pigments and other ink additives) are known to the skilled man and need not to be further discussed here.

The origin of the IR-absorption in the herein disclosed intaglio inks is different of that of the $YbPO_4$ IR-absorber disclosed by Tashima et al. (e.g. JP 08-143853), which is a narrow-band absorption and due to an electronic transition within the f-shell of a rare-earth ion ($Yb(^{3+})$). It is also different of that of the reduced heteropoly acids (phosphomolybdic acid) disclosed in U.S. Pat. No. 4,244,741, which are due to cooperative electronic charge transfer transitions within a complex molecular ion, rather than to a transition within an isolated molybdenum atom's d-shell.

The origin of the IR-absorption of the herein disclosed intaglio inks is furthermore clearly different of that of the narrow-band near-infrared-absorbing cyanine-type organic dyes of EP-A-0 608 118, as well as of that of the broad-band nigrosine dyes of U.S. Pat. No. 3,705,043, and of other organic dyes, such as the IR-absorbing phthalocyanines and their relatives. The light absorption properties of the mentioned organic dyes is noteworthy tied to their extended molecular electronic π-system, involving the carbon and other atoms' electronic p-shells. Such extended π-systems have, however, the shortcoming of an increased chemical reactivity; apart from some exceptions, the majority of the known organic dye molecules are for this reason not very stable under environmental influence (light, moisture, atmospheric oxygen).

The IR-absorbers of the present invention do not rely neither on cooperative inter-atomic or inter-ionic absorption effects of atoms or ions within molecules or solid state compounds, such as are the intervalence charge transfer bands of 'mixed-valence' compounds (Prussian blue, etc.) or the band-gap absorption of semiconducting materials (GaAs, etc.); in contrary, the herein considered compounds only rely on the intra-atomic (respectively intra-ionic) property of electronic d-d-transitions. Said d-d-transitions are primarily a property of the isolated atoms or ions, albeit they are, to a certain extent, also influenced by the atom's or ion's chemical environment.

Preferred IR-absorbing materials in the context of the present invention are copper(II)-and/or iron(II)-compounds, e.g. the phosphates of the said elements, and preferably in the form of a solid state compound for maximum durability. However, alternatively, the IR-absorbing transition element atoms or ions can also be bound to a component of the polymer binder of the ink, in particular if the binder component contains specific binding sites for transition element ions, preferably for $Cu(^{2+})$, and/or for $Fe(^{2+})$. Said binding sites can be phosphate or phosphonate groups, preferably monohydrogenophosphate diester groups, which are cross-linked into, or grafted onto, a polymer backbone. Alternatively, the IR-absorbing complex of a transition element atom or ion and a binding site can be simply contained in the polymer, such as e.g. an organic thioruea-copper(II) complex, dissolved in the binder.

In the context of the present invention, a preferred solid-state IR-absorber, comprising the IR-absorbing transition element atoms or ions, is a crystalline compound, composed of one or more cations and one or more anions. Preferred anions are selected from the rock-forming anions, i.e. those which form insoluble oxidic minerals with a large variety of cations, such as the hydroxide, the oxide, and the fluoride anions, as well as the various borates, carbonates, aluminates, silicates, phosphates, sulfates, titanates, vanadates, arsenates, molybdates and tungstates. At least one anion is preferably selected from the group consisting of phosphate ($PO_4^{3-}$), hydrogenophosphate ($HPO_4^{2-}$), pyrophosphate ($P_2O_7^{4-}$), metaphosphate ($P_3O_9^{3-}$), polyphosphate, silicate ($SiO_4^{4-}$), the condensed polysilicates, titanate ($TiO_3^{2-}$), the condensed polytitanates, vanadate ($VO_4^{3-}$), the condensed polyvanadates, molybdate ($MoO_4^{2-}$), the condensed polyvanadates, tungstate ($WO_4^{2-}$), the condensed polytungstates, fluoride ($F^-$), oxide ($O^{2-}$), and hydroxide ($OH^-$).

Preferred IR-absorbing cations, in combination with the said anions, are iron(II) ($Fe^{2+}$) and copper(II) ($Cu^{2+}$), either alone, or in solid solution with their IR-inactive mineralogical congeners, e.g. with magnesium(II) ($Mg^{2+}$) in the case of iron(II), and with zinc(II) ($Zn^{2+}$) in the case of copper(II).

Useful IR-absorbing crystalline compounds in the context of the present invention are such which do not lose part of their composition, e.g. included water of crystallization, when heated to a moderately high temperature, i.e. to a temperature not exceeding 400° C. In fact, it has been found of advantage to use dehydrated compounds, respectively to previously dehydrate those compounds which contain water of crystallization or otherwise lose-able groups, by heating them in air to a temperature between 200° C. and 400° C. for about one to four hours (depending on the compound in question), until constant weight is reached.

Specifically, the following compounds can be used in the invention: copper (II) fluoride ($CuF_2$), copper hydroxyfluoride (CuFOH), copper hydroxide ($Cu(OH)_2$), copper phosphate ($Cu_3(PO_4)_2 * 2H_2O$), anhydrous copper phosphate ($Cu_3(PO_4)_2$), basic copper(II) phosphates (e.g. $Cu_2PO_4(OH)$, "Libethenite" whose formula is sometimes written as $Cu_3(PO_4)_2 * Cu(OH)_2$; $Cu_3(PO_4)(OH)_3$, "Cornetite", $Cu_5(PO_4)_3(OH)_4$, "Pseudomalachite", $CuAl_6(PO_4)_4(OH)_8 . 5H_2O$ "Turquoise", etc.), copper(II) pyrophosphate ($Cu_2(P_2O_7) * 3H_2O$), anhydrous copper(II) pyrophosphate ($Cu_2(P_2O_7)$), copper(II) metaphosphate ($Cu(PO_3)_2$, more correctly written as $Cu_3(P_3O_9)_2$), iron(II) fluoride ($FeF_2 * 4H_2O$), anhydrous iron(II) fluoride ($FeF_2$), iron-(II) phosphate ($Fe_3(PO_4)_2 * 8H_2O$, "Vivianite"), lithium iron(II) phosphate ($LiFePO_4$, "Triphylite"), sodium iron(II) phosphate ($NaFePO_4$, "Maricite"), iron(II) silicates ($Fe_2SiO_4$, "Fayalite"; $Fe_xMg_{2-x}SiO_4$, "Olivine"), iron(II) carbonate ($FeCO_3$, "Ankerite", "Siderite"); nickel(II) phosphate ($Ni_3(PO_4)_2 * 8H_2O$), or titanium(III) metaphosphate ($Ti(P_3O_9)$). Moreover, the crystalline IR-absorber also be a mixed ionic compounds, where two or more cations are participating in the crystal structure, as e.g. in $Ca_2Fe(PO_4)_2 * 4H_2O$, "Anapaite". Similarly, two or more anions can participate in the structure as in the mentioned basic copper phosphates, where $OH(^-)$ is the second anion, or even both together, as in magnesium iron phosphate fluoride, $MgFe(PO_4)F$, "Wagnerite".

The solid state IR-absorber can furthermore be a glass, comprising the IR-absorbing transition element ion or ions. Preferred glasses are of the phosphate-and/or fluoride-comprising types, in which there is a coordination of the transition element ion or ions to the phosphate and/or fluoride anions present in the glass. These anions are noteworthy situated at the lower end of the "spectrochemical series", i.e. they provide for low-energy d-d transitions in transition element ions, pushing the ion's absorption bands towards the infrared. As to the "spectrochemical series", reference is made to A. B. P. Lever, "Inorganic Electronic Spectroscopy", $2^{nd}$ edition, "Studies in Physical and Theoretical Chemistry, Vol. 33", Elsevier, Amsterdam, 1984, Chapter 9 and references cited therein.

IR-absorber glasses which can be introduced in a correspondingly powdered form into the herein disclosed Intaglio ink are e.g. those of JP 05-279078 A2 and JP 05-093160 A2, the documents which were already cited above.

Pigments and additives for Intaglio ink formulations have a statistical particle size preferably not exceeding 50 micrometers, more preferably not exceeding 20 micrometers, most preferably not exceeding 10 micrometers. No individual particle at all shall exceed a size of 100 micrometers (upper cut-off limit), a goal which is generally achieved through a final classifying (sieving) operation. Too large particles, even in small number, lead noteworthy to problems on the printing press, as the ink tends to be wiped out of the engraving.

The specific absorption in the 'optical infrared' range (i.e. between 700 nm and 2500 nm) of the infrared-absorbing material, which is exploited in the Intaglio ink of the present invention, is thus merely a consequence of intra-atomic or intra-ionic electronic d-d-transitions. The absorber material may however, in addition to this exploited IR-absorption, exhibit further d-d-transition bands in the visible range (i.e. between 400 nm and 700 nm), as well all types of absorption bands in the ultraviolet region of the spectrum (i.e. below 400 nm).

The IR-absorber materials which are used in the Intaglio ink of the present invention are, however, different from the transition metal pigments of the prior art, such as the nickel and cobalt pigments used in decorative coatings ('cobalt blue', etc.; U.S. Pat. No. 3,748,165), or the iron-based yellow, red and black pigments used in classical printing and coating applications. In these transition metal pigments of the prior art, a visible absorption effect is intentionally sought and exploited. The basic idea of the present invention is, however, to rely on IR-absorbing pigments which are not, or at most only little colored in the visible range of the spectrum (400 nm to 700 nm), in order to be compatible with all kinds of visible shades of the ink and to be useful in invisible markings.

Preferred IR-absorbing materials in the ink of the present invention are therefore those which do not substantially absorb in the visible range of the spectrum (400 nm to 700 nm), i.e. those whose CIE (1976) diffuse reflectance lightness (L*) value is higher than 70, preferably higher than 80, as measured on the neat powder.

To obtain a sufficiently strong absorption effect, the IR-absorbing transition metal atoms or ions must be present at rather high concentration in the IR-absorbing material; typically in a concentration of 10% or more, preferably 20% or more, and even more preferably 40% or more, by weight. The IR-absorber materials which are used in the Intaglio ink of the present invention are thus different of the transition-element containing luminescent compounds, such as ruby ($Al_2O_3$:Cr) or the transition metal doped garnets (cf. U.S. Pat. No. 3,550,033) and other crystals used in laser applications. These luminescent compounds noteworthy contain the sensitizing or emitting transition metal ions merely at low concentrations, which are suitable for producing the said luminescence effects.

Furthermore, the Intaglio ink of the present invention must contain the IR-absorbing material at a sufficiently high concentration level, so as to produce a good contrast on the printed document in the said IR range of the spectrum. Useful concentrations of the absorber material in the ink range from 5% to 70%, preferably 10% to 50%, even more preferably 20% to 50%, by weight of the ink; these concentration levels are significantly higher than the concentration levels used in the case of luminescent markers.

The said concentration level of the IR-absorbing material can furthermore be varied within the inks used on a same document, in order to produce infrared-darker and -clearer zones on the document, or to print a hidden infrared-half-tone picture, respectively. This can be embodied, e.g. by a document carrying at least two IR-absorbing inks according to the invention, wherein said IR-absorbing inks differ in their level of IR-absorption.

In another embodiment, a same ink comprising the IR-absorber can be printed with an intaglio plate having zones of different engraving depths. This results, in particular in the case of the moderately IR-absorbing transition metal compounds used in the present invention, in infrared-darker and clearer zones on the document. This modulation of infrared-absorption density can furthermore be camouflaged by a strong visible-absorbing pigmentation of the intaglio ink, such that the difference of engraving depth does not show up in a difference of the visible color.

Furthermore, the IR-absorbing material of the present invention, providing a broad absorption profile, can be usefully combined, within a same ink, with all types of other IR-absorbing materials disclosed in the art, and in particular with IR-absorbing organic materials. IR-absorbing organic materials having a narrower absorption peak than transition metal based IR-absorbing materials are particularly preferred in the present context. This combination allows indeed to produce an even more complex absorption profile in the infrared and to increase herewith the sophistication and the security of the hidden marking. The organic IR-absorbing material may also be present in a second ink, printed on the same document, in order to exploit the resulting, machine-readable contrast.

The IR-absorbing Intaglio ink of the present invention is preferably used for the production of security documents, such as banknotes, passports, checks, vouchers, ID-cards, transaction-cards, stamps, tax labels, etc. The IR-absorbing ink may herein be either printed as a stand-alone security feature, or used in conjunction with not-IR-absorbing inks having the same visible shade, to produce a covert IR-absorption pattern. Furthermore, the IR-absorbing ink of the present invention may be combined on a same document with other IR-absorbing inks having a different composition than the herein disclosed one, in particular with inks containing an organic IR-absorber.

A process for manufacturing an ink for engraved steel die printing, according to the present invention, comprises the step of incorporating an infrared absorbing material comprising a transition element atom or ion, whose infrared absorption is a consequence of electronic transitions within the d-shell of said transition element atom or ion, into a polymeric organic binder, together with optionally required further materials.

The manufacturing of an intaglio ink, including the adjustment of its viscosity and its other rheologic properties in order to achieve printing performance, and the intaglio printing process itself, are known to the skilled man and need not to be explained further here.

The Intaglio ink of the present invention shall now be further explained with the help of exemplary, non-limiting embodiments.

EXAMPLE 1

Oxidative Drying Intaglio Ink Formulation Comprising Phosphate Glass Infrared Absorber (For the Paper Wipe Copperplate Intaglio Printing Process)

| | |
|---|---|
| Addition product of tung oil and maleic acid modified phenolic resin in a high boiling mineral oil (PKWF 28/31) | 25.0 |
| Long oil alkyd resin | 7.5 |
| Alkylphenolic resin modified with raw tung oil in Ink Solvent 6/9 (S.I.C.) | 16.0 |
| Polyethylene wax (mp 130° C.) | 1.5 |
| Calcium carbonate (natural chalk) | 13.0 |
| Phosphate glass IR-absorbing pigment (*) | 25.0 |
| Colored pigment (**) | 5.0 |
| Ink Solvent 6/9 (S.I.C.) (**) | 6.0 |

-continued

| | |
|---|---|
| Cobalt octoate drier (11% metal) | 0.1 |
| Manganese octoate drier (10% metal) | 0.1 |

Figure 1:
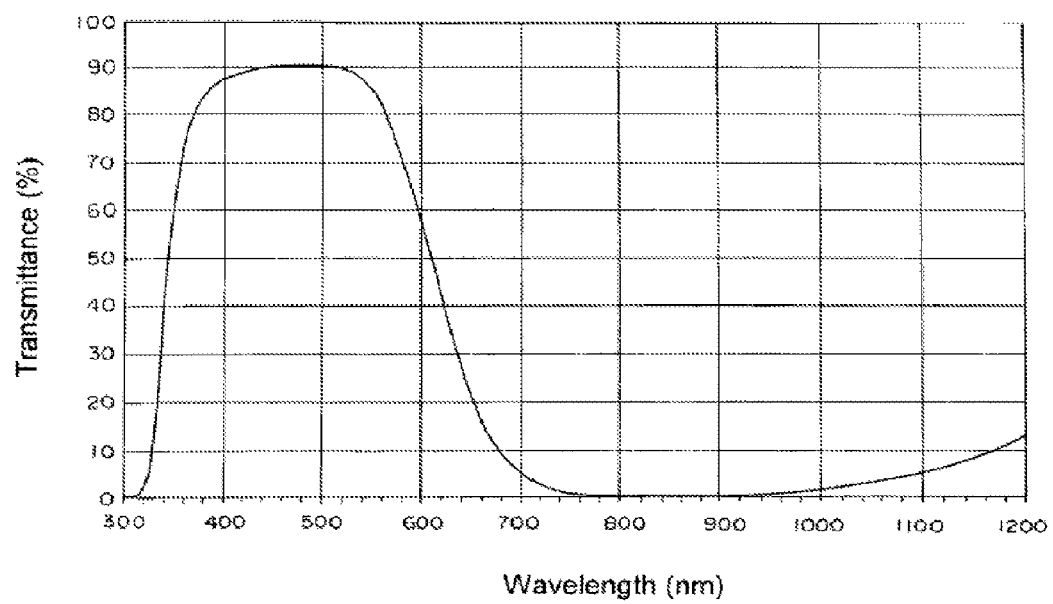
FIG. 1 shows the IR-absorption characteristics of the copper(II) phosphate glass pigment used in example 1 of the present application.
Figure 2:
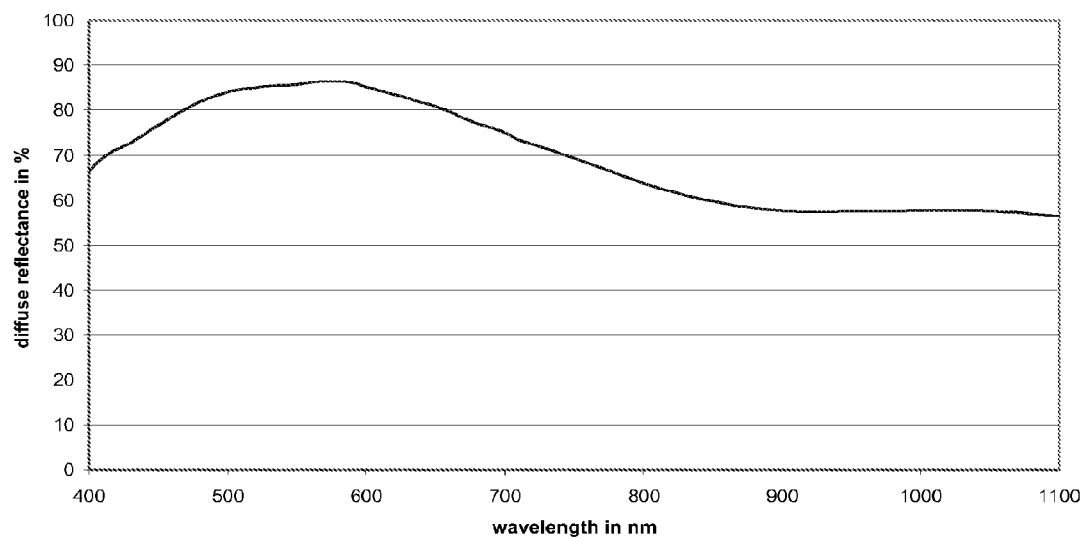
FIG. 2 shows the IR-absorption characteristics of a white Intaglio ink comprising copper phosphate according to example 2 of the present application.

(*) The glass-ceramic IR-absorbing pigment was prepared by grinding a phosphate glass IR-absorber (FIG. 1) according to US 2004/0082460, example 1, to an average particle size of the order of 8 to 10 micrometers. For obtaining inks of corresponding colors, but without the IR-absorbing feature, the IR-absorbing pigment was replaced by the same weight amount of calcium carbonate.
(**) The colored pigment was chosen according to the desired shade, e.g.:
White   C.I. Pigment White 6
Yellow  C.I. Pigment Yellow 13
Red     C.I. Pigment Red 170
Green   C.I. Pigment Green 7
Blue    C.I. Pigment Blue 15:3
Violet  C.I. Pigment Violet 23
Black   Trichromic Black (C.I. Pigment Red 170; C.I. Pigment Yellow 13; C.I. Pigment Blue 15:3 in appropriate ratio). This pigment mixture is an "IR-transparent black" which allows for transparency of the ink in the farther optical infrared range.
(***) The viscosity of the ink was adjusted with Ink Solvent 6/9 (Shell Industrial Chemicals) to a value between 5 and 10 Pa · s at 40° C.

Color-matched pairs of inks of determined visible shades, each shade once with and once without the IR-absorber, were prepared by, each time, mixing all the components of the formula, except the driers, together, and performing two passes on a three-roll-mill, in order to obtain a homogeneous ink. The driers were added at last and mixed in for 15 minutes, and the finished ink was degassed under vacuum. The viscosity of the ink was adjusted to 10 Pa·s at 40° C.

The so obtained inks were printed with a standard intaglio press on banknote paper in the form of a pattern comprising visible colors and covert IR-features. IR-absorption patterns, useful for the machine-processing of currency, could in this way be realized in complete independence of the visible aspect of the document.

EXAMPLE 2

Oxidative Drying Sheet Fed Intaglio Ink for the Water Wipe Copperplate Intaglio Printing Process A water containing, non-interleaving intaglio ink is manufactured according to the following formula:

| | |
|---|---|
| Macromolecular surfactant as described in U.S. Pat. No. 4,966,628 | 15.0 |
| Alkylphenolic tung oil adduct diluted in a high boiling point oil (Magie 500) to a solids content of 80% | 8.0 |
| Long oil alkyd resin diluted in a high boiling point mineral oil (Magie 500) to a solids content of 80% | 10.0 |
| Sodium salt of sulfonated castor oil in water (solids content 60%) | 2.0 |
| Micronized polyethylene wax | 2.0 |
| High boiling point mineral oil (Magie 500) | 3.0 |
| IR-absorbing phosphate pigment (*) | 35.0 |
| C.I. Pigment White 6 | 3.0 |
| Calcium carbonate | 15.0 |
| Multi-metal dryer (octoate salts of cobalt, manganese and zirconium diluted in a high boiling point mineral oil to a solids content of 85%) | 2.0 |

-continued

| | |
|---|---|
| Deionized water thickened with a cellulose ether (MC or sod-CMC 2.5% to 3.0%) (***) | 15.0 |

(*) The IR-absorbing phosphate pigment was dehydrated copper phosphate of the formula $Cu_3(PO_4)_2$, obtained by heating hydrated copper phosphate for 2 hours at 400° C. in air.
For obtaining inks of corresponding colors, but without the IR-absorbing feature, the IR-absorbing pigment was replaced by the same weight amount of calcium carbonate.
(***) The cellulose ether was chosen from the group of Methylcellulose (MC) and/or Sodium Carboxymethylcellulose (sodCMC) and used as described by C. Baker, The Book and Paper Group Annual, Vol. 1, 1982.

Color-matched pairs of white inks, once with and once without the IR-absorber, were prepared by, each time, mixing all the components of the formula, except the drier and the water, together for 20 minutes at room temperature on a Molteni mixer, then performing two passes on a three-roll-mill in order to achieve a homogeneous ink. The drier and the water were added at last and mixed in for 15 minutes; the resulting ink was degassed under vacuum on a Molteni mixer. The viscosity of the ink was adjusted to 10 Pa·s at 40° C.

EXAMPLE 3

A UV-curing, cationically polymerizable Intaglio ink was manufactured in a classical way (i.e. by pre-mixing of all of the ingredients, then performing two passes on a three-roll-mill) according to the following formula:

| | |
|---|---|
| Cationically polymerizable varnish as described in U.S. Pat. No. 5,658,964 | 44.0 |
| Onium salt based initiator (CYRACURE UVI 6974-Union Carbide) | 7.0 |
| IR-absorbing phosphate pigment (*) | 15.0 |
| Colored pigment (**) | 3.0 |
| Fumed silicom dioxide (AEROSIL 200 --Degussa) | 15.0 |
| Micronizod polyethylene wax (CERIDUST 9615A-Hoechst) | 5.0 |
| Surfactant (SILWET L 7604--Union Carbide) | 1.0 |
| Viscosity regulator (TRIETHYLENE GLYCOL-Dow Chemicals) | 10.0 |

Figure 3:
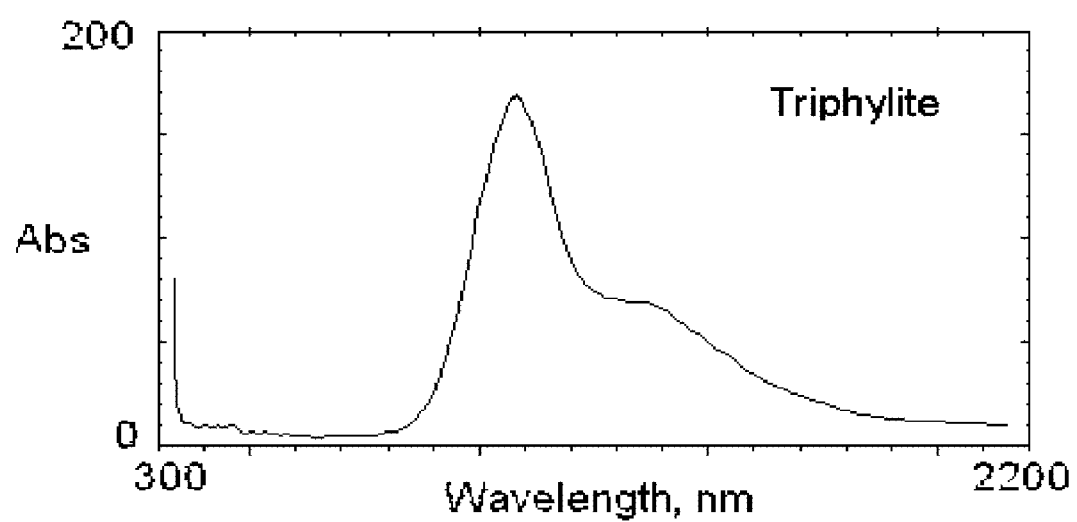
FIG. 3 shows the IR-absorption characteristics of the iron phosphate "Triphylite" ($LiFePO_4$) used in example 3 of the present application.

(*) The IR-absorbing phosphate pigment was chosen to be lithium iron(II) phosphate ($LiFePO_4$, "Triphylite"), having an absorption spectrum as given in FIG. 3.
For obtaining inks of corresponding colors, but without the IR-absorbing feature, the IR-absorbing pigment was replaced by the same weight amount of calcium carbonate.
(**) The colored pigment was chosen according to the desired shade, as given in example 1.

The ink was adjusted to a viscosity of 12.5 Pa·s at 40° C. It showed an excellent response to cure with UV light, as well as a very good dark aftercure. The ink was paper wipeable and fulfilled all the requirements needed by engraved steel die inks to be used for printing of security documents.

EXAMPLE 4

A UV-Curing, Urethane-Acrylate Intaglio Ink Comprising IR-Absorbing Phosphate Resin

| | |
|---|---|
| Reactive urethane-acrylate monomer | 26.6 |
| IR-absorbing monomer (*) | 20.0 |
| Carnauba Wax | 4.0 |
| Sodium Dodecylbenzenesulfonate | 3.0 |
| UV stabilizer (Florstab UV-1) | 2.0 |
| Colored pigment (**) | 5.0 |
| Filler ($CaCO_3$) (***) | 33.0 |

| | |
|---|---|
| ESACURE ® ITX | 2.6 |
| IRGACURE 369 | 3.8 |

Figure 4:
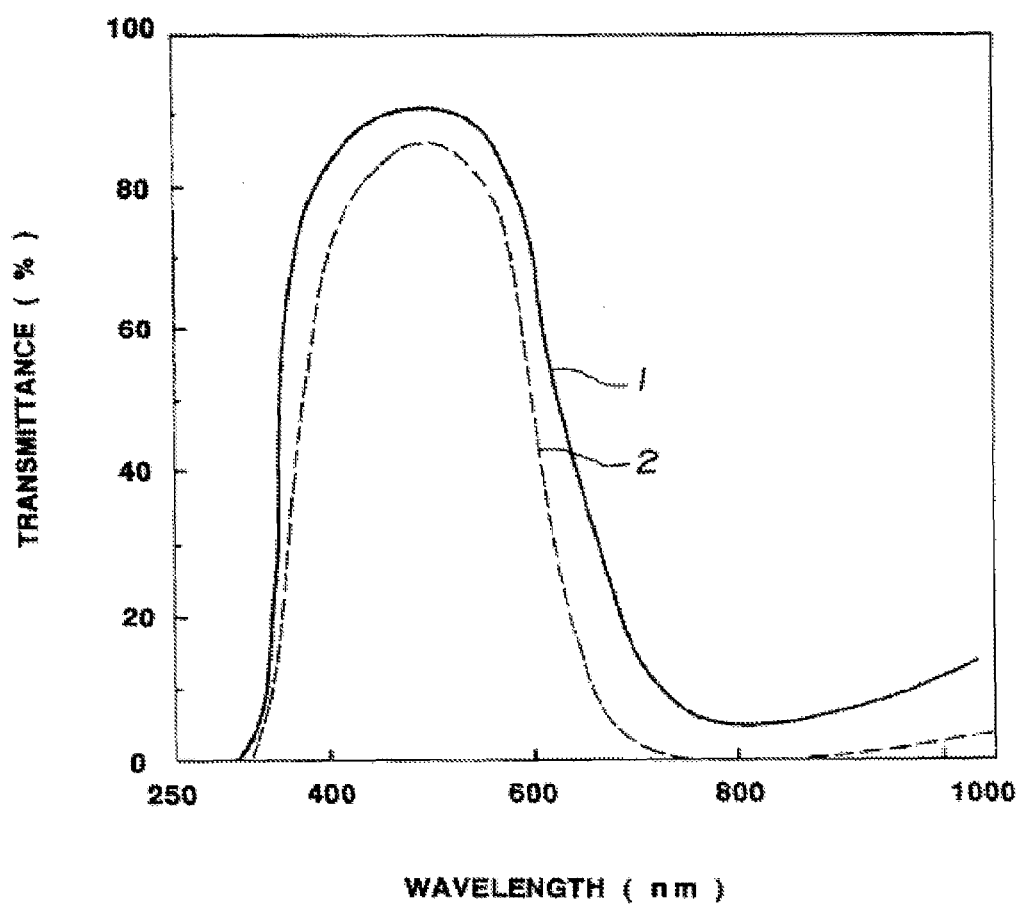
FIG. 4 shows the IR-absorption characteristics of the copper(II) and/or iron(II) phosphate polymers used in example 4 of the present application.

(*) The IR-absorbing monomer was prepared with reference to U.S. Pat. No. 5,466,755, example 1 (cf. FIG. 4, curve 1) or example 2 (cf. FIG. 4, curve 2); the indicated monomers and the copper(II) salt, respectively the copper(II) and the iron(II) salts were mixed together at warm (60° C.), without, however, adding a polymerization initiator.
(**) The colored pigment was chosen according to the desired shade, as given in example 1.
(***) The ink was adjusted to a viscosity above 5 Pa · s at 40° C. It showed good response for curing with long wavelength UV light.

Printed documents, such as a banknote, a passport, a check, a voucher, an ID-or transaction-card, a stamp, a tax label, etc., carrying an ink according to the invention, as exemplified in particular by the given examples, were realized by printing the ink on a standard Intaglio press. The IR-absorbing ink were either printed as a stand-alone security feature, or, alternatively combined with not-IR-absorbing inks of the same shade, to produce covert IR-absorption patterns in addition to the visible features on the said documents.

EXAMPLE 5

Figure 5:
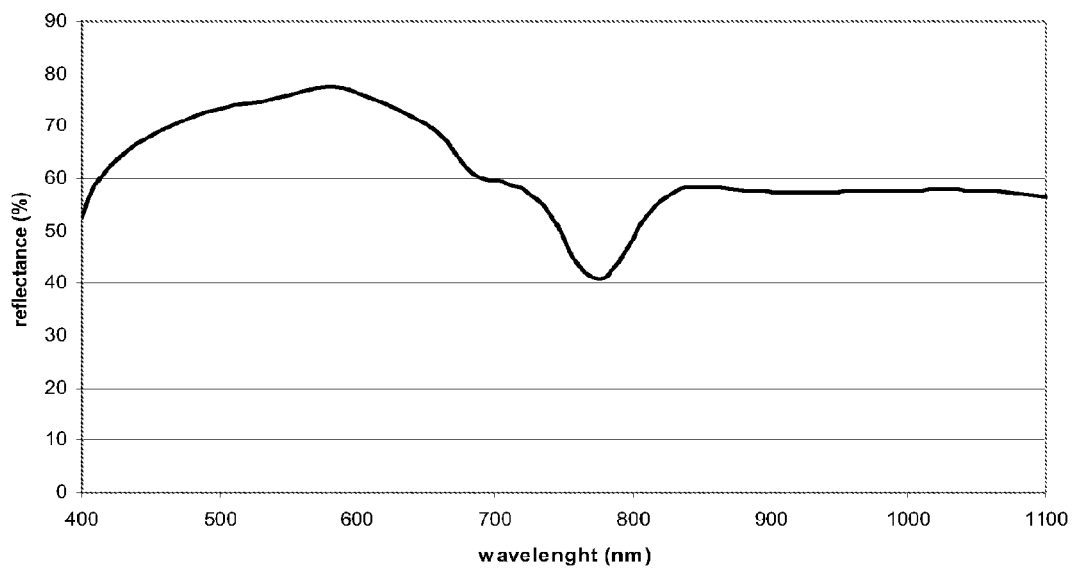
FIG. 5 shows the IR-absorption characteristics of an Intaglio ink comprising copper phosphate and an additional organic IR-absorber, according to example 5 of the present application.

Intaglio Oxidative Ink with Additional Specific IR Absorption Peaks (with Reference to FIG. 5)

| | |
|---|---|
| Addition product of tung oil and maleic acid modified phenolic resin in a high boiling mineral oil (PKWF 28/31) | 25.05 |
| Long oil alkyd resin | 7.5 |
| Alkylphenolic resin modified with raw tung oil in ink solvent 6/9 (Shell Industrial Chemicals) | 16.0 |
| Polyethylen wax | 1.5 |
| Calcium carbonate | 19.0 |
| Dehydrated copper phosphate of the formula $Cu_3(PO_4)_2$, obtained by heating hydrated copper phosphate for 2 hours at 400° C. in air | 25.0 |
| Hexadeca-(3-ethoxy-1-thiophenolato)-phtalocyanato-zinc(II) | 0.15 |
| Ink solvent 6/9 (Shell Industrial Chemicals) | 5.0 |
| Cobalt octoate (11% metal) | 0.1 |
| Manganese octoate (10% metal) | 0.1 |

The ink was prepared as described above.

What is claimed is:

1. IR-absorbing ink for an engraved steel die printing process, comprising:
   a polymeric organic binder and an IR-absorbing material,
   said ink having a pasty consistency with a viscosity value at 40° C. of at least 3 Pa·s, wherein said IR-absorbing material comprises a transition element compound, and wherein infrared absorption of the IR-absorbing material is a consequence of electronic transitions within the d-shell of transition element atoms or ions,
   said IR-absorbing material is present in a concentration from 10% to 50% by weight of the ink, and contains IR-absorbing transition element atoms or ions at a concentration of at least 10% by weight, and absorbs in the near infrared range (700 to 1100 nm), and has a CIE (1976) diffuse reflectance lightness (L*) value greater than 70 as measured on the neat powder, and is transparent in some range between 1100 and 2500 nm.

2. The IR-absorbing ink according to claim 1, wherein said ink has a pasty consistency with a viscosity value at 40° C. of at least 5 Pa·s.

3. The IR-absorbing ink according to claim 1, wherein said transition element atoms or ions comprise at least one atom selected from the group consisting of Ti, V, Cr, Mn, Fe, Co, Ni, and Cu.

4. The IR-absorbing ink according to claim 1, wherein said transition element atoms or ions comprise at least one ion selected from the group of ions consisting of $Ti^{3+}$, $VO^{2+}$, $Cr^{5+}$, $Fe^{2+}$, $Ni^{2+}$, $Co^{2+}$, and $Cu^{2+}$.

5. The IR-absorbing ink according to claim 1, wherein said IR-absorbing material comprising said IR-absorbing transition element atoms or ions is a glass, in which there is a coordination of the transition element atoms or ions to phosphate and/or fluoride anions present in the glass.

6. The IR-absorbing ink according to claim 1, wherein said IR-absorbing material comprising IR-absorbing transition element atoms or ions comprises a glass, and said glass is a phosphate-and/or fluoride-comprising glass.

7. The IR-absorbing ink according to claim 1, wherein said infrared absorbing material comprising said IR-absorbing transition element atoms or ions is a crystalline compound, being composed of one or more cations and one or more anions.

8. The IR-absorbing ink according to claim 7, wherein said anion is selected from the group consisting of phosphate ($PO_4^{3-}$), hydrogenophosphate ($HPO_4^{2-}$), pyrophosphate ($P_2O_7^{4-}$), metaphosphate ($P_3O_9^{3-}$), polyphosphate, silicate ($SiO_4^{4-}$), the condensed polysilicates; titanate ($TiO_3^{2-}$), the condensed polytitanates, vanadate ($VO_4^{3-}$), the condensed polyvanadates, molybdate ($MoO_4^{2-}$), tungstate ($WO_4^{2-}$), the condensed polytungstates, fluoride ($F^-$), oxide ($O^{2-}$), and hydroxide ($OH^-$).

9. The IR-absorbing ink according to claim 7, wherein said infrared absorbing material is selected from the group of compounds consisting of copper (II) fluoride ($CuF_2$), copper hydroxyfluoride (CuFOH), copper hydroxide ($Cu(OH)_2$), copper phosphate ($Cu_3(PO_4)_2*2H_2O$), anhydrous copper phosphate ($Cu_3(PO_4)_2$), the basic copper(II) phosphates, copper(II) pyrophosphate ($Cu_2(P_2O_7)*3H_2O$), anhydrous copper (II) pyrophosphate ($Cu_2(P_2O_7)$), copper(II) metaphosphate ($Cu_3(P_3O_9)_2$), iron(II) fluoride ($FeF_2*4H_2O$), anhydrous iron (II) fluoride ($FeF_2$), iron(II) phosphate ($Fe_3(PO_4)_2*8H_2O$, Vivianite), lithium iron(II) phosphate ($LiFePO_4$, Triphylite), sodium iron(II) phosphate ($NaFePO_4$, Maricite), iron(II) silicates ($Fe_2SiO_4$, Fayalite; $Fe_xMg_{2-x}SiO_4$, Olivine), iron(II) carbonate ($FeCO_3$, Ankerite, Siderite); nickel(II) phosphate ($Ni_3(PO_4)_2*8H_2O$), titanium(III) metaphosphate ($Ti(P_3O_9)$), $Ca_2Fe(PO_4)_2*4H_2O$, (Anapaite), and $MgFe(PO_4)F$, (Wagnerite).

10. The IR-absorbing ink according to claim 1, wherein said IR-absorbing material includes IR-absorbing transition element atoms or ions bound to a component of said polymeric organic binder of said ink.

11. The IR-absorbing ink according to claim 10, wherein said polymeric organic binder of said ink contains specific binding sites for transition element ions.

12. The IR-absorbing ink according to claim 11, wherein said transition element ions are $Cu^{2+}$ and/or $Fe^{2+}$.

13. The IR-absorbing ink according to claim 11, wherein said binding sites are phosphate groups which are cross-linked into, or grafted onto a polymer backbone.

14. The IR-absorbing ink according to claim 1, wherein said IR-absorbing material is an IR-absorbing complex of a transition element atom or ion and a binding site contained in the polymer.

15. The IR-absorbing ink according to claim 14, wherein said IR-absorbing complex of a transition element atom or ion and a binding site contained in the polymer is an organic thioruea-copper(II) complex dissolved in said binder.

16. The IR-absorbing ink according to claim 1, wherein said IR-absorbing material has a CIE (1976) diffuse reflectance lightness (L*) value higher than 80, as measured on the neat powder.

17. The IR-absorbing ink according to claim 1, wherein said IR-absorbing material contains IR-absorbing transition element atoms or ions at a concentration of 20% or more by weight.

18. The IR-absorbing ink according to claim 1, wherein said IR-absorbing material contains IR-absorbing transition element atoms or ions at a concentration of 40% or more by weight.

19. The IR-absorbing ink according to claim 1, comprising said IR-absorbing material in a concentration in the range from 20% to 50% by weight of the ink.

20. The IR-absorbing ink according to claim 1, comprising an organic compound as an additional IR-absorber.

21. The IR-absorbing ink according to claim 20, wherein said additional IR-absorber displays a narrower IR-absorption peak than the transition metal based IR-absorbing material.

22. A method of producing an IR-absorbing ink for an engraved steel die printing process according to claim 1, comprising combining the polymeric organic binder and the IR-absorbing material.

23. A method according to claim 22, wherein the ink has a pasty consistency with a viscosity value at 40° C. of at least 5 Pa·s.

24. The method according to claim 22, wherein the transition element atoms or ions comprise at least one atom selected from the group consisting of Ti, V, Cr, Mn, Fe, Co, Ni, and Cu.

25. The method according to claim 22, wherein the transition element atoms or ions comprise at least one ion selected from the group of ions consisting of $Ti^{3+}$, $VO^{2+}$, $Cr^{5+}$, $Fe^{2+}$, $Ni^{2+}$, $Co^{2+}$, and $Cu^{2+}$.

26. The IR-absorbing ink according to claim 9, wherein the basic copper(II) phosphates comprise $Cu_2(PO_4)_2(OH)$ (Libethenite), $Cu_3(PO_4)_2(OH)_3$ (Cornetite), $Cu_5(PO_4)_3(OH)_4$ (Pseudomalachite), and $CuAl_6(PO_4)_4(OH)_8 \cdot 5H_2O$ (Turquoise).

* * * * *